(12) United States Patent
Nolan (10) Patent No.: US 9,986,443 B1
(45) Date of Patent: May 29, 2018

(54) OPTIMIZING COVERAGE OF INFRASTRUCTURE EQUIPMENT

(71) Applicant: T-Mobile USA, Inc., Bellevue, WA (US)

(72) Inventor: Patrick Nolan, Concord, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days. days.

(21) Appl. No.: 15/396,245

(22) Filed: Dec. 30, 2016

(51) Int. Cl.
| | | |
|---|---|---|
| *H04B 7/00* | (2006.01) | |
| *H04B 1/38* | (2015.01) | |
| *H04M 1/00* | (2006.01) | |
| *H04W 16/28* | (2009.01) | |
| *H04B 17/318* | (2015.01) | |
| *H04B 17/345* | (2015.01) | |
| *H04W 64/00* | (2009.01) | |

(52) U.S. Cl.
CPC .......... *H04W 16/28* (2013.01); *H04B 17/318* (2015.01); *H04B 17/345* (2015.01); *H04W 64/003* (2013.01)

(58) Field of Classification Search
CPC .................................................. H04W 16/28
USPC .............................. 455/562.1, 418
See application file for complete search history.

(56) References Cited

U.S. PATENT DOCUMENTS

| | | | |
|---|---|---|---|
| 7,668,530 B2 * | 2/2010 | Reudink ............... | H04W 16/10 379/112.05 |
| 8,112,089 B2 * | 2/2012 | Aoyama ............... | H04W 16/18 455/446 |
| 8,237,806 B2 | 8/2012 | Tanaka et al. | |
| 9,491,763 B2 * | 11/2016 | Dribinski ................ | H01Q 3/00 |
| 2015/0126173 A1 * | 5/2015 | Dribinski ................ | H01Q 3/00 455/418 |

* cited by examiner

*Primary Examiner* — Tilahun B Gesesse
(74) *Attorney, Agent, or Firm* — Knobbe, Martens, Olson & Bear, LLP (57) ABSTRACT

Traditional configuration of infrastructure equipment relates to the adjustment of horizontal tilt for antennas. Given the potential overlap of infrastructure equipment, varying tilt angles can result in either interference with nearby equipment ("over-tilt") or reduced coverage areas within a specific infrastructure equipment ("under-tilt"). A tool for determining appropriate tilt angles for infrastructure antennas across a mobile network is provided. The tool utilizes network-based planning modules to determine appropriate horizontal tilt angle for a set of infrastructure equipment. The tool automatically determines a range of tilt angles between a selected source antenna and adjacent antennas and optimizes based on a threshold intersecting point.

20 Claims, 5 Drawing Sheets

OPTIMIZING COVERAGE OF INFRASTRUCTURE EQUIPMENT

Generally described, communication networks include various equipment to facilitate the operation of the communication network. In the context of a wireless communication network, a network service provider can provision network infrastructure equipment at various geographic locations to facilitate transmission and processing of wireless signals exchanged with mobile devices. In most wireless communication networks, various aspects of the infrastructure equipment can be configured based on utilization of software interfaces and applications that adjust the operation of the infrastructure equipment.

In some implementations, the configuration of infrastructure equipment can be accomplished by a manual selection of various data values. One such configuration includes the selection of horizontal tilt angle related to directional antennas associated with the infrastructure equipment. Different horizontal tilt angles can affect communications with mobile devices.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, the present application relates to the configuration of network infrastructure equipment. More specifically, aspects of the present application relate to the configuration of infrastructure equipment by automatic determination of mechanical tilt angles for a set of individual infrastructure equipment. By utilizing information about individual infrastructure equipment, a system can determine mechanical tilt angle specifications for each infrastructure equipment by calculating tilt angles in which intersecting ranges of signals from adjacent infrastructure equipment remain within a defined range.

Generally described, individual infrastructure equipment includes one or more antenna components for transmitting radio signals to mobile devices. The antenna components can be configured with mechanical tilt mechanisms that can be configured or receive instructions to adjust a tilt angle of the antenna component. With the adjustment of the antenna component, the potential range of the individual signals from the infrastructure equipment can vary. In situations in which the mechanical tilt angle of infrastructure equipment is defined closer to horizontal, the signals from that infrastructure equipment have a greater likelihood of encompassing a desired range of coverage by the service provider. However, setting such a tilt angle also increases the likelihood that signals from the infrastructure equipment will interfere with signals being transmitted by adjacent infrastructure equipment, especially if the mechanical tilt angles for the adjacent infrastructure equipment are also set closer to horizontal. In situations in which the mechanical title angle of infrastructure equipment is defined closer to vertical, the signals from that infrastructure equipment will not likely encompass the desired range of coverage by the service provider. However, setting such a tilt angle also decreases the likelihood that the signals from the infrastructure equipment will interfere with signals being transmitted from adjacent infrastructure equipment. Current approaches to manage infrastructure equipment are deficient in that they are generally limited to manual selection of individual infrastructure equipment tilt angles and do not scale well for larger sets of infrastructure equipment.

In accordance with an illustrative embodiment, a system is provided for facilitating the generation of information for configuring infrastructure equipment. The system utilizes various information regarding a set of infrastructure equipment including a relative height of individual infrastructure equipment and a relative distance between adjacent infrastructure equipment. Additionally, the system can utilize information related to the limitations of the specific terrain that might limit or enhance potential interference. Utilizing the individual information for the set of infrastructure equipment, the system can then iteratively calculate upper and lower ranges for intersecting points with signals generated from adjacent infrastructure equipment. Illustratively, the upper and lower ranges are defined in terms of a predetermined measure of signal strength from the infrastructure equipment relative to the distance between the adjacent infrastructure equipment. The process will repeat for the entire set of infrastructure equipment. Upon completion, the system can then transmit the individual determined tilt angles for the set (or a subset) of infrastructure equipment to cause the automatic configuration of the set of infrastructure equipment.

Although various aspects of the disclosure will be described with regard to illustrative examples and embodiments, one skilled in the art will appreciate that the disclosed embodiments and examples should not be construed as limiting.

Figure 1:
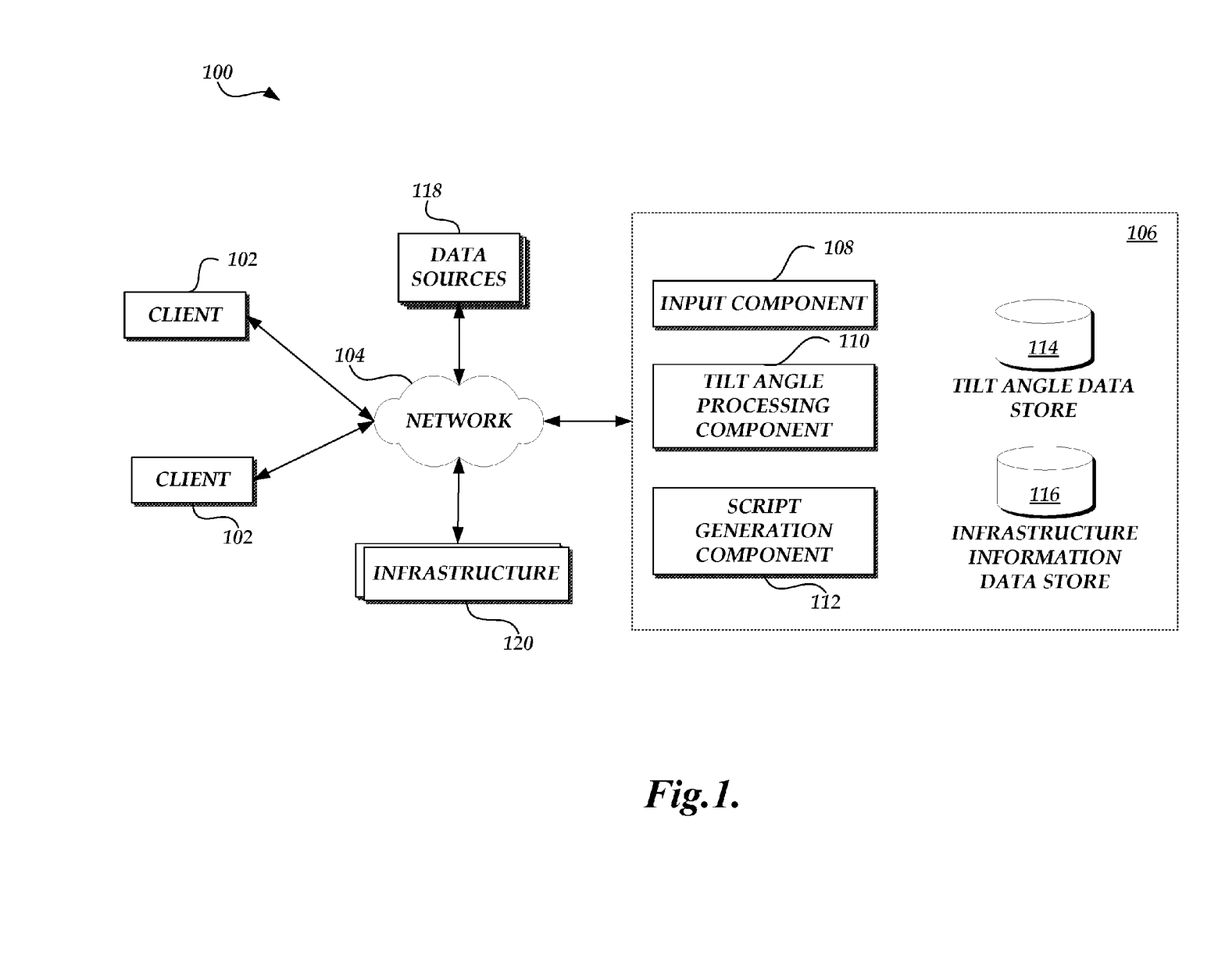
FIG. 1 is a schematic block diagram of an illustrative communication network topology including one or more client computing devices, one or more third party data sources, one or more infrastructure equipment, and an infrastructure configuration service.

FIG. 1 is a block diagram illustrative of a networked computing environment 100 for managing infrastructure equipment in accordance with the present disclosure. As illustrated in FIG. 1, the networked computing environment 100 includes one or more client computing devices 102 ("client") operable to transmit requests for configuration of network infrastructure equipment and provide information related to the configuration of network infrastructure equipment via a communications network 104.

In an illustrative embodiment, the client 102 can correspond to a wide variety of computing devices including personal computing devices, laptop computing devices, hand-held computing devices, terminal computing devices, mobile devices (e.g., mobile phones, tablet computing devices, etc.), wireless devices, various electronic devices and appliances, and the like. The client 102 includes necessary hardware and software components for establishing communications over the communications network 104. For example, the client 102 may be equipped with a network interface that facilitates communications via the network 104. The network 104 can be a publicly accessible network of linked networks, possibly operated by various distinct parties, such as the Internet. In other embodiments, the network 140 may include a private network, local area network ("LAN"), wide area network ("WAN"), cable network, satellite network, wireless telecommunications network, any other medium of computer data transfer, or some combination thereof. The client 102 may also have varied local computing resources such as a central processing unit, data store, input/output devices, a bus interface, memory, and so forth.

The networked computing environment 100 may also include an infrastructure configuration service 106 for obtaining data inputs related to infrastructure equipment or implementation of infrastructure equipment and generation of executable code, such as scripts, that can cause various configuration changes in infrastructure equipment. As illustrated in FIG. 1, the infrastructure configuration service 106 can include an input component 108 or application for obtaining information from client 102, networked data stores, local data stores, or third party data providers. The infrastructure configuration service 106 can further include a title angle processing component 110 or application for processing received data to determine mechanical title angles for a set of identified infrastructure equipment. The infrastructure configuration service 106 can further include a script generation component 112 or application for utilizing calculated tilt angles to generate the executable code utilized by the infrastructure equipment to cause a change in the mechanical tilt angles.

Illustratively, the infrastructure configuration service 106 can be implemented on one or more physical computing devices. The physical computing devices include necessary hardware and software components for implementing the components/applications identified above as well as other applications or components. Such local computing resources such as a central processing unit, data store, input/output devices, a bus interface, memory, and so forth. Additional software such as networking software, virtualization software, operating system, and other applications are further included in the physical computing device.

The infrastructure configuration service 106 can also include or be associated with a tilt angle data store 114 and an infrastructure equipment data store 116 that provide the design templates and pre-determined data utilized in the generation of configuration scripts. One skilled in the relevant art will appreciate that will the data stores 114 and 116 are depicted as a single data store, the data stores may encompass multiple data stores implemented in a distributed manner, a centralized manner or a combination thereof.

With continued reference to FIG. 1, the networked computing environment 100 can further include various third party data sources 118 for transmitting data utilized in the processing of information to determine title angles. For example, one or more data stores can provide terrain information, topography information, etc. Additionally, as illustrated in FIG. 1, the networked computing environment 100 can further include a set of infrastructure equipment 120 the form at least a portion of a wireless communication network and which receive and process configuration scripts generated by the infrastructure configuration service 106.

Further, the modules or components illustrated in FIG. 1 may include additional components, systems, and subsystems for facilitating the methods and processes. For example, in various embodiments, the client 102 may be centralized in one computing device, distributed across several computing devices, implemented by one or more virtual machine instances, or distributed through a network. Likewise, the infrastructure configuration service 106 may be implemented in or more physical computing devices, virtual computing devices, and the like.

Figure 2:
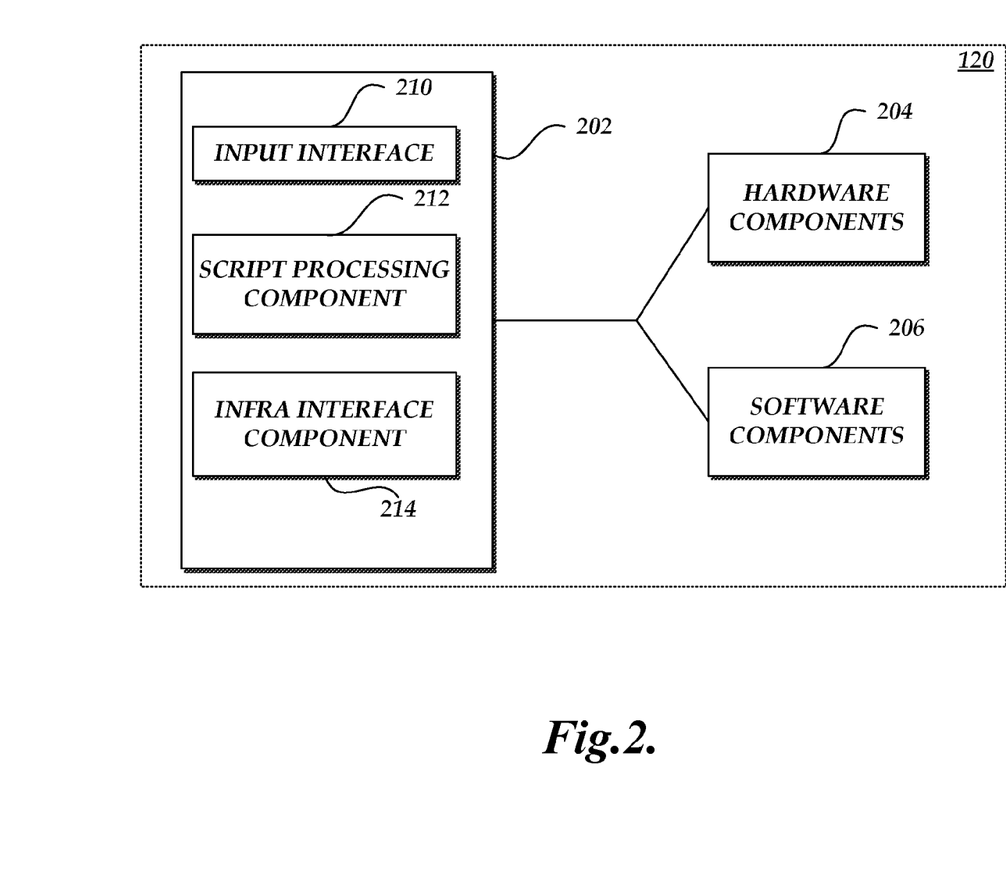
FIG. 2 is a schematic block diagram of an illustrative infrastructure equipment including a configuration application.

With reference now to FIG. 2, a schematic block diagram of illustrative infrastructure equipment 120 including a configuration application 202 will be described. Illustratively, infrastructure equipment 120 can be embodied in a variety of communication network equipment and combination of communication network equipment. For purposes of the present application, the various hardware and software functionality of infrastructure equipment will not be described in detail. Rather, illustrative aspects of the functionality of infrastructure equipment to obtain and process executable code provided by the infrastructure configuration service 106 will be described.

The infrastructure equipment 120 includes necessary hardware and software components for establishing communications over the communications network 104. For example, the infrastructure equipment 120 may be equipped with a network interface that facilitates communications via the network 104. The infrastructure equipment 120 may also have varied local computing resources such as a central processing unit, data store, input/output devices, a bus interface, memory, and so forth. As illustrated in FIG. 1, the infrastructure equipment 120 can include a script processing service/application 202. The functionality of the script processing service 202 can include a script input interface 210 or application for obtaining executable code or other information from the infrastructure configuration service 106. The script processing service 202 can further include a script processing component 212 or application for processing the data received in configuration scripts and identifying modifications or changes to various hardware or software aspects of the infrastructure equipment 120. The script processing service 106 can further include an interface component 214 or application for causing modifications to hardware 204 or software 206 components utilized in the operation of the infrastructure equipment 120, including the adjustment of mechanical tilt angles based on instructions. One skilled in the art will appreciate that the infrastructure equipment may have more or fewer components than those depicted in illustrative FIG. 2.

Figure 3:
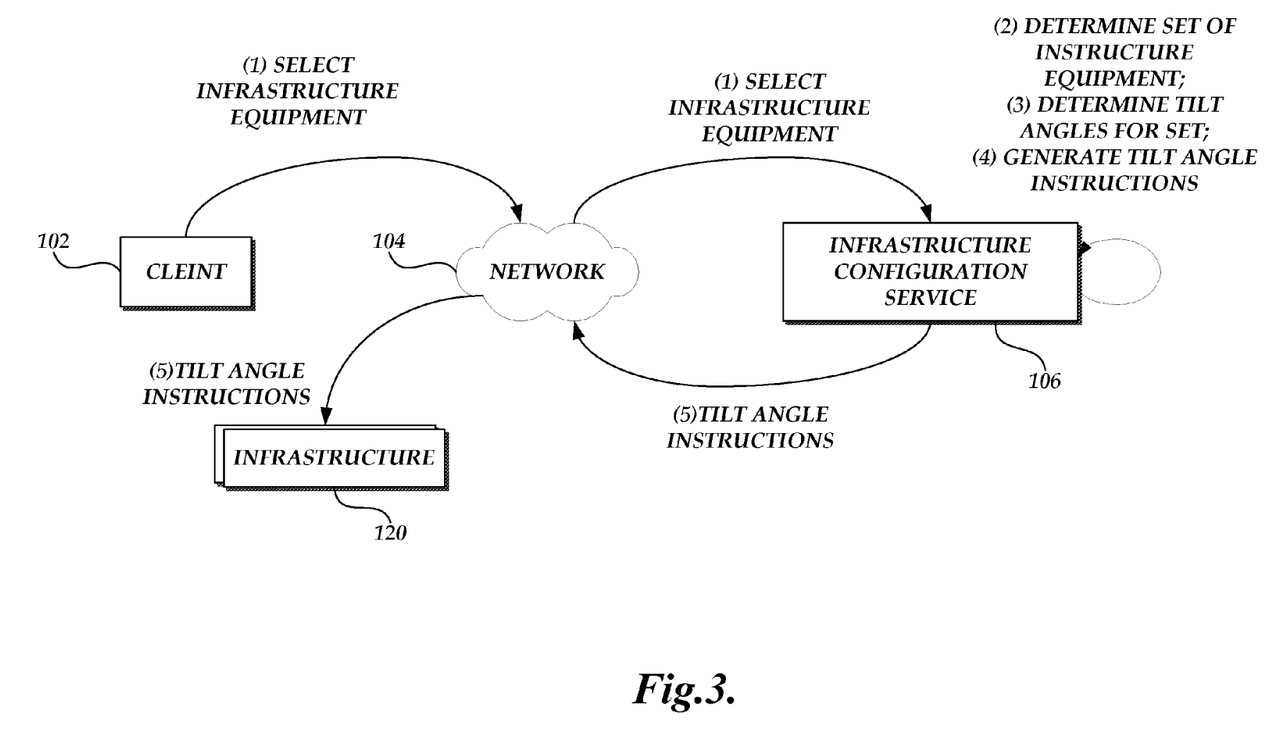
FIG. 3 is a schematic block diagram of the communication network of FIG. 1 illustrating interaction between multiple infrastructure equipment.

With reference now to FIG. 3, a block diagram of the network topology of FIG. 1 illustrating the creation and configuration of tilt angle in infrastructure equipment will be described. At (1), a client 102 initiates the process by transmitting a request for the configuration of a set of infrastructure equipment. Illustratively, the process may be instantiated by selection a control of a graphical user interface generated by an application on the client 102. The process may also be instantiated as part of integrated process related to provisioning infrastructure equipment. The request can illustratively include information sufficient to identify the infrastructure equipment to be configured, the user requesting the configuration and one or more data sources that will be utilized to configure the infrastructure equipment. In other embodiments, profile information accessed via authentication may also be the source of at least a portion of the information. For example, user configuration profiles can identify processing rules and data sources without requiring specification in the request.

At (2), the infrastructure configuration service 106 receives the request and processes the request to determine one or more tilt angles for the set of identified infrastructure equipment. In one embodiment, the infrastructure configuration service 106 can verify that the infrastructure equipment is available for configuration and can filter out any infrastructure equipment that would not be compatible or that have otherwise been excluded for use in the configuration. In other embodiments, the infrastructure configuration service 106 can also supplement the selection of infrastructure equipment based on rules or other logic. Still further, the infrastructure configuration service 106 can obtain data, such as characteristics of the infrastructure equipment, weather conditions, network congestion characterizations, terrain information, geographic information, such as geographic coordinates the infrastructure equipment, which may be utilized to calculate tilt angles. Additionally, the infrastructure configuration service 106 can obtain any specific rules or configuration limitations for specific infrastructure equipment, such as limits in the ranges of mechanical tilt angles, known interferences or adjustments, or historical information related to previous tilt angle calculations.

At (3), the infrastructure configuration service 106 determines tilt angles for the set of identified infrastructure equipment 120. As will be described in greater detail below, the infrastructure configuration service 106 can conduct an iterative process for the set of infrastructure equipment in which the infrastructure configuration service 106 will utilize the relative distance and height between a selected infrastructure equipment and adjacent infrastructure equipment. More specifically, the infrastructure configuration service 106 will illustratively select a mechanical tilt angle for the antenna component of individual infrastructure equipment 120 such that the signals from the infrastructure equipment 120 will fall within a calculated upper bound and lower bound based on potential interference from terrain and adjacent infrastructure. At (4), the infrastructure configuration service 106 then generates tilt angle configuration scripts, code or instructions that will cause the individual infrastructure equipment implement the specified mechanical tilt.

At (5), the infrastructure configuration service 106 transmitted the appropriate scripts to the various infrastructure equipment 120 (directly or indirectly). The receiving infrastructure equipment 120 can then execute the executable code and based on the information specified in the configuration executable code cause the modification of one or more aspects of the infrastructure equipment to implement the tilt angle. Illustratively, the process illustrated in FIG. 3 can be repeated multiple times in which user input or measure interference information can be incorporated into the determination of new tilt angles. Likewise, the infrastructure configuration service 106 can be configured to automatically initiate an update of calculated tilt angles based on time of day, provisioning of new infrastructure equipment, loss of infrastructure equipment, generation of network outages or errors, etc.

Figure 4:
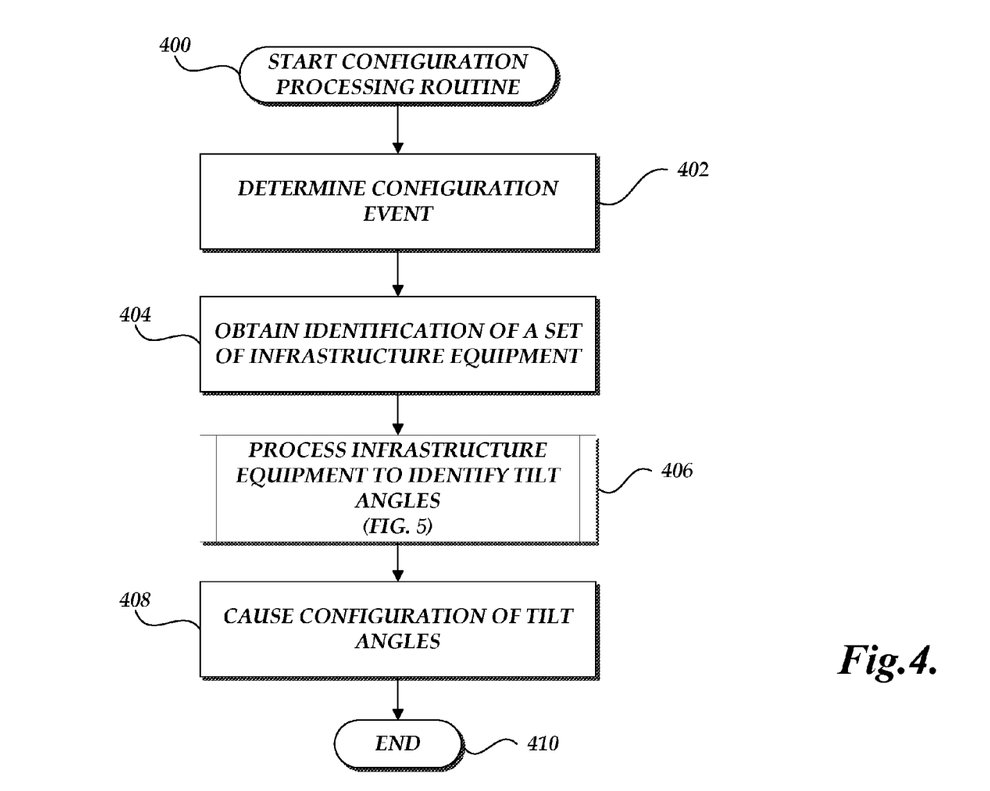
FIG. 4 is a schematic block diagram of the communication network of FIG. 1 illustrating the generation and processing of tilt angles for infrastructure equipment.

FIG. 4 is a flow diagram illustrative of an infrastructure configuration information processing routine 400 implemented by an infrastructure configuration service 106. At block 402, the infrastructure configuration service 106 obtains a configuration event. Illustratively, the configuration event can correspond to receipt of a request for determination of tilt angles. As described above, a client 102 initiates the process by transmitting a request for the selection of tilt angles. Illustratively, the process may be instantiated by selection a control of a graphical user interface generated by an application on the client 102. In other embodiments, the configuration event can correspond to time of day criteria (e.g., run once per day), provisioning of new infrastructure equipment, loss of infrastructure equipment, generation of network outages or errors, evaluations of measure service performance (e.g., measure service quality relative to thresholds), and the like. The request can illustratively include information sufficient to identify the infrastructure equipment to be configured, the user requesting the configuration and one or more data sources that will be utilized to configure the infrastructure equipment. In other embodiments, profile information accessed via authentication may also be the source of at least a portion of the information. For example, user configuration profiles can identify processing rules and data sources without requiring specification in the request.

At block 404, the infrastructure configuration service 106 can identify a set of infrastructure equipment 120 that are available for use in configuration. As previously described, in one embodiment, the infrastructure configuration service 106 can verify that the infrastructure equipment is available for configuration and can filter out any infrastructure equipment that would not be compatible or that have otherwise been excluded for use in the configuration. In other embodiments, the infrastructure configuration service 106 can also supplement the selection of infrastructure equipment based on rules or other logic. Still further, the infrastructure configuration service 106 can obtain data, such as characteristics of the infrastructure equipment, weather conditions, network congestion characterizations, terrain information, geographic information, such as geographic coordinates the infrastructure equipment, which may be utilized to calculate tilt angles. Additionally, the infrastructure configuration service 106 can obtain any specific rules or configuration limitations for specific infrastructure equipment, such as limits in the ranges of mechanical tilt angles, known interferences or adjustments, or historical information related to previous tilt angle calculations.

At block 406, the infrastructure configuration service 106 generates tilt angles for the set of identified infrastructure equipment 120. An illustrative sub-routine for the determination of tile angles will be described with regard to FIG. 5. At block 408, the infrastructure configuration service 106 transmits instructions to individual infrastructure equipment based on respective, determined mechanical tilt angle. The receiving infrastructure equipment 120 can then execute the executable code and based on the information specified in the configuration executable code cause the modification of one or more aspects of the infrastructure equipment to implement the tilt angle. At block 410, the routine 400 terminates.

Figure 5:
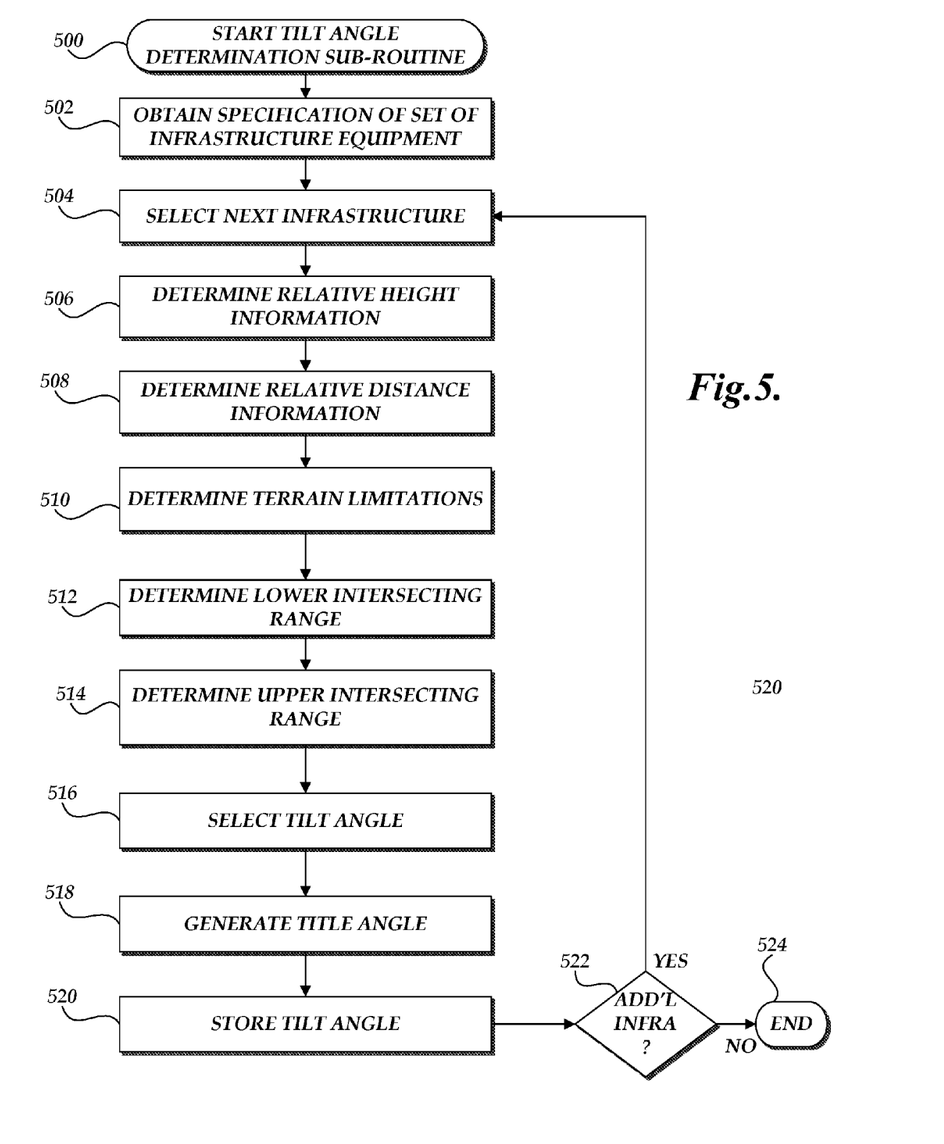
FIG. 5 is a flow diagram illustrative of tilt angle determination sub-routine implemented by an infrastructure configuration service.

With reference now to FIG. 5, a flow diagram illustrative of a tilt angle determination sub-routine 500 implemented by an infrastructure configuration service 106 will be described. As described above, sub-routine 500 can illustrative be implemented as part of block 406 (FIG. 4). At block 502, the infrastructure configuration service 106 identifies the set of infrastructure equipment that will be configured with mechanical tilt angles or updated mechanical tilt angles. As previously described, the set of infrastructure equipment 120 can be based on selection by an administrator, such as via a graphical interface, a previously established definition of the set of infrastructure equipment, a dynamic specification of a set of infrastructure equipment based on evaluation of rules or search criteria, and the like. As part of the identification of the set of infrastructure equipment 120, the infrastructure configuration service 106 can also identify for individual infrastructure equipment 120 one or more adjacent infrastructure equipment by geography. The infrastructure configuration service 106 can utilize various information to make such a calculation, such as by mathematically processing geographic coordinates for individual infrastructure equipment 120 to find adjacent infrastructure equipment. In other embodiments, some of the information may be pre-populated or manually entered.

At block 504, the infrastructure configuration service 106 then enters into an iterative loop by selection of infrastructure equipment in the set of infrastructure equipment as the current infrastructure equipment. At block 506, the infrastructure configuration service 106 determines relative height information for the current infrastructure equipment. As previously described, the infrastructure configuration service 106 can obtain information related to the geographic location of infrastructure equipment including the specific altitude at the geographic location. Additionally, the infrastructure configuration service 106 can obtain information related to the height of the physical structure in which the antenna component is mounted (e.g., the height of a tower, building, etc.). Utilizing the information, the infrastructure configuration service 106 can then calculate a relative height value for the current infrastructure equipment. Such a height value may be specified in any number of ways with relation to a number of baselines or may be specified in multiple ways. Additionally, the infrastructure configuration service 106 can determine the height values for one or more infrastructure equipment 120 that have been identified as adjacent. Accordingly, the infrastructure configuration service 106 can then determine relative height information for the current infrastructure equipment and adjacent infrastructure equipment. For example, the infrastructure configuration service 106 can subtract the height values for the current infrastructure equipment 120 and the adjacent infrastructure equipment. In some embodiments, at least a portion of the relative height information may be pre-calculated.

At block 508, the infrastructure configuration service 106 can then determine relative distance information between the current infrastructure equipment and the identified adjacent infrastructure equipment 120. Illustratively, the infrastructure configuration service 106 can utilize various information to make such relative distance calculations, such as by mathematically processing geographic coordinates for individual infrastructure equipment 120 to find a distance value. At block 510, the infrastructure configuration service 106 determines potential terrain limitations that might affect mechanical tilt angles. In embodiments, in which the infrastructure equipment 120 is located in relatively flat terrain with no physical objects blocking signals, the terrain should not factor into any form of interference with the signals generated by the current infrastructure equipment 120. In other embodiments, however, the terrain of the land or other physical boundaries might generate one or more sources of interference for the signals. Accordingly, the infrastructure configuration service 106 can obtain the identification of such potential sources of additional interference from data sources, historical information, and the like.

At block 512, the infrastructure configuration service 106 identifies a lower range for intersecting signals between the current infrastructure equipment 120 and the adjacent infrastructure equipment. Illustratively, the lower range for the intersecting signals can be defined according to a predefined measurement relative to the signal strength experienced or likely to be experienced. In this embodiment, the infrastructure configuration service 106 can utilize various modeling tools, historical measurements, and the like to identify the lower range. By way of non-limiting example, in one embodiment, the lower range is defined by a three decibel change in signal strength from the location of infrastructure equipment and the intersecting point.

At block 514, the infrastructure configuration service 106 identifies an upper range for intersecting signals between the current infrastructure equipment 120 and the adjacent infrastructure equipment. Illustratively, the upper range for the intersecting signals can also be defined according to a predefined measurement relative to the signal strength experienced or likely to be experienced. In this embodiment, the infrastructure configuration service 106 can utilize various modeling tools, historical measurements, and the like to identify the upper range. By way of non-limiting example, in one embodiment, the upper range is defined by a three decibel change in signal strength from the location of infrastructure equipment and the intersecting point. Illustratively, the upper range and lower range may be associated with different value ranges. Additionally, the physical distance represented by the lower range and the upper range may be different even though the range values are the same.

At block 516, the infrastructure configuration service 106 determines a tilt angle for the current infrastructure equipment 120. Illustratively, the infrastructure configuration service 106 can select a tilt angle that such that the upper range of the signal strength will fall within approximate mark 75% of the distance between the current infrastructure equipment and the adjacent infrastructure equipment. To make this calculation, the infrastructure configuration service 106 utilizes the relative height information to determine the downward or upward tilt angle to match to the horizontal relative distance information. Additionally, in the event terrain information prevents specific tilt angles, the infrastructure configuration service 106 can select a different percentage of the relative distance.

At block 518, the infrastructure configuration service 106 generates the tilt angle instructions. Illustratively, the infrastructure configuration service 106 then generates tilt angle configuration scripts, code or instructions that will cause the individual infrastructure equipment implement the specified mechanical tilt. At block 520, the infrastructure configuration service 106 stores the calculated tilt angles for historical information.

At decision block 522, a test is conducted to determine whether additional tilt angles need to be determine for infrastructure equipment in the set of infrastructure equipment. If so, the sub-routine 500 returns to block 504 to select the next infrastructure equipment. If not, at block 524, the sub-routine 500 terminates.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for processing horizontal tilt angle for a plurality of infrastructure equipment comprising:
   identifying a plurality of infrastructure equipment in a set of infrastructure equipment, wherein each infrastructure equipment is defined with an antenna height;
   for individual infrastructure equipment,
   identifying one or more adjacent infrastructure equipment;
   determining a relative height based on antenna height information associated with the individual infrastructure equipment and the one or more adjacent infrastructure equipment;
   determine a distance between the individual infrastructure equipment and the one or more adjacent infrastructure equipment;
   determining a lower intersecting range between signals from the individual infrastructure equipment and the one or more adjacent infrastructure equipment, wherein the lower intersecting range is defined by a predetermined measurement;
   determining an upper intersecting range between signals from the individual infrastructure equipment and the one or more adjacent infrastructure equipment, wherein the upper intersecting range is defined by the predetermined measurement;
   selecting a tilt angle based on the upper and lower intersecting range;
   causing a configuration of the individual infrastructure equipment based on the selected tilt angle.

2. The method as recited in claim 1, wherein the predetermined measurement corresponds to signal strength.

3. The method as recited in claim 2, wherein the signal strength corresponds to three decibels.

4. The method as recited in claim 1, wherein causing a configuration of the individual infrastructure equipment based on the selected tilt angle includes causing an electronic manipulation of tilt angle.

5. The method as recited in claim 1, wherein the predetermined measurement corresponds to a percentage of distance between the individual infrastructure equipment and the one or more adjacent infrastructure equipment.

6. The method as recited in claim 5, wherein the percentage is seventy five percent.

7. A system for processing horizontal tilt angles for a plurality of infrastructure equipment comprising:
   an interface, executed on a computing device having a processor and a memory, the interface for obtaining an identification a plurality of infrastructure equipment in a set of infrastructure equipment, wherein each infrastructure equipment is defined with an antenna height;

a tilt angle data processing component, configured to be executed by the computing device, wherein the tilt angle data processing component is operable to:

identify one or more adjacent infrastructure equipment for a selected infrastructure equipment;

determine an intersecting range between signals from the selected infrastructure equipment and the one or more adjacent infrastructure equipment based on a determined relative height and distance between the selected infrastructure equipment and the one or more adjacent infrastructure equipment;

select a tilt angle based on the determined intersecting range;

cause transmission of a configuration of the selected infrastructure equipment based on the selected tilt angle.

8. The system as recited in claim 7, wherein the tilt angle data processing component determines an equidistant intersecting range between signals from the selected infrastructure equipment and the one or more adjacent infrastructure equipment.

9. The system as recited in claim 8, wherein the equidistant intersecting range corresponds to a predetermined measurement.

10. The system as recited in claim 9, wherein the predetermined measurement corresponds to signal strength.

11. The system as recited in claim 9, wherein the predetermined measurement corresponds to a percentage of distance between the selected infrastructure equipment and the one or more adjacent infrastructure equipment.

12. The system as recited in claim 7, wherein the tilt angle data processing component causes a configuration of the selected infrastructure equipment based on the selected tilt angle includes causing an electronic manipulation of tilt angle.

13. A method for processing a horizontal tilt angle for a plurality of infrastructure equipment comprising:

identifying a plurality of infrastructure equipment in a set of infrastructure equipment, wherein each infrastructure equipment is defined with an antenna height;

for individual infrastructure equipment,
identifying one or more adjacent infrastructure equipment;

selecting a tilt angle based on an identified upper and lower interference range, wherein the upper and lower interference range is calculated based on a relative height and distance associated with the individual infrastructure equipment and the one or more adjacent infrastructure equipment; and generating a configuration of the individual infrastructure equipment based on the selected tilt angle.

14. The method as recited in claim 13, wherein the upper and lower interference range corresponds to a predetermined measurement.

15. The method as recited in claim 14, wherein the predetermined measurement corresponds to signal strength.

16. The method as recited in claim 14, wherein the predetermined measurement corresponds to a percentage of the distance between the individual infrastructure equipment and the one or more adjacent infrastructure equipment.

17. The method as recited in claim 13 further comprising causing a configuration of the individual infrastructure equipment based on the selected tilt angle includes causing an electronic manipulation of tilt angle.

18. The method as recited in claim 13, wherein the upper and lower interference range is calculated based on geographic information associated with the individual infrastructure equipment and the one or more adjacent infrastructure equipment.

19. The method as recited in claim 13, wherein generating a configuration of the individual infrastructure equipment based on the selected tilt angle includes generating a command to manipulate tilt angle.

20. The method as recited in claim 13 further comprising modeling signal strength to validate the generated configuration.

* * * * *